L. ULLMAN.
EGG BEATER.
APPLICATION FILED NOV. 29, 1919.
1,337,860. Patented Apr. 20, 1920.
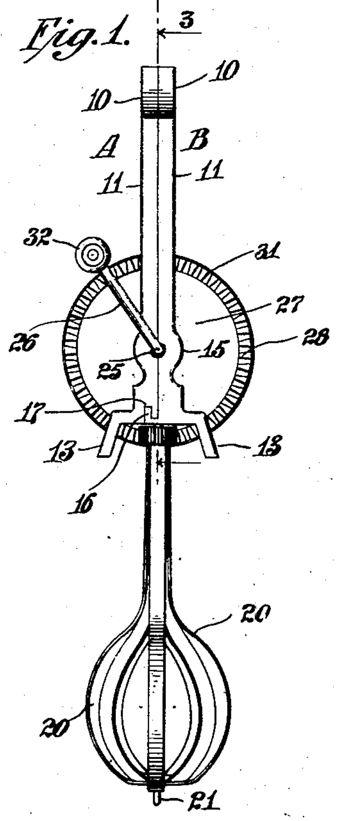
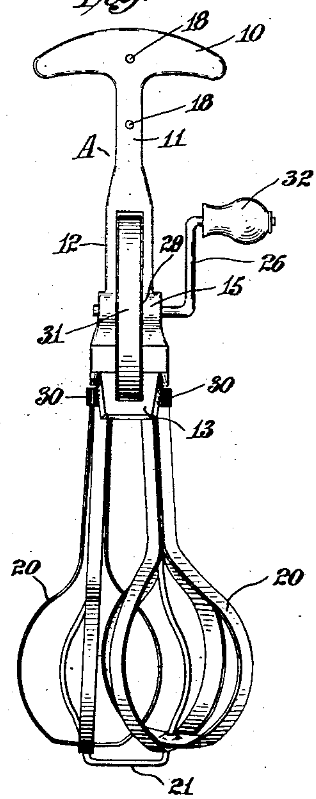
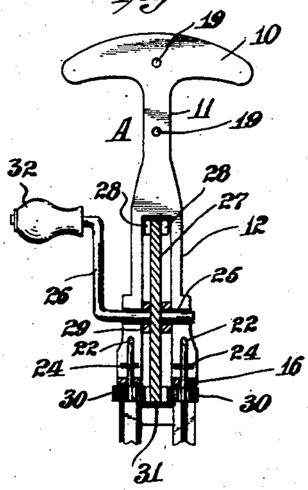
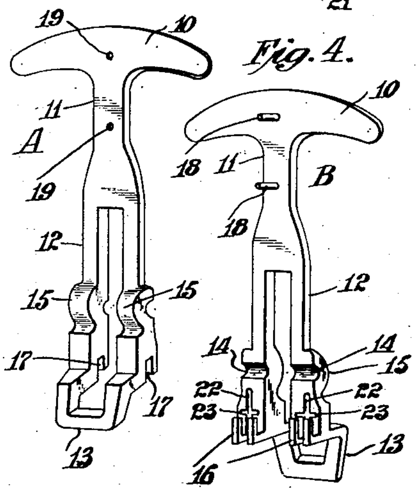
INVENTOR
LOUIS ULLMAN
BY
HIS ATTORNEY

UNITED STATES PATENT OFFICE.

LOUIS ULLMAN, OF NEW YORK, N. Y.

EGG-BEATER.

1,337,860. Specification of Letters Patent. Patented Apr. 20, 1920.

Application filed November 29, 1919. Serial No. 341,399.

*To all whom it may concern:*

Be it known that I, LOUIS ULLMAN, a citizen of the United States, residing at New York city, in the county and State of New York, have invented certain new and useful Improvements in Egg-Beaters, of which the following is a specification.

My invention relates to improvements in egg beaters.

One object of the invention is to provide an egg beater which, in its entirety, is of simple and strong construction and capable of being cheaply manufactured and easily assembled. Another object is to provide improved means for securely retaining the beater members in attachment with the handle. A further object is to effectually hold the main driving gear and the driven beater pinions in mesh. Other objects of the invention will be disclosed in the following description.

The invention consists of the novel structural features, and combinations of parts hereinafter described with reference to the accompanying drawing, wherein Figure 1 is a side elevational view of the improved egg beater; Fig. 2 is a view at right angles to Fig. 1; Fig. 3 is a vertical sectional view on the line 3—3 of Fig. 1 of a fragment of the device; and Fig. 4 is a perspective view of the handle separated into its constituent parts.

Referring to the drawing in detail, it will be noted that the handle consists of two substantially similar members which, for convenience of description, are denoted A and B in Fig. 1. Each of these members includes a head 10, an intermediate reduced neck portion 11, a bifurcated shank 12 and a laterally projecting apertured angular flange 13 at the lower terminus of the shank. Intermediate their ends the legs of each shank 12 are provided with semi-circular bearings 14 in bosses 15 formed in the legs. The handle members are provided with suitable means for interlocking the same, the preferred construction consisting of angular lugs or claws 16 at the lower end of one of the shanks designed to engage suitably formed apertures 17 in the lower face of the other shank member. It is, of course, immaterial which handle member is provided with the lugs 16 and which with the apertures 17; in the drawing the member A having the apertures and the member B the lugs. When assembled the handle members are additionally secured together by rivets 18 carried by one member entering holes 19 formed in the other member.

The beaters 20 are, as is usual, formed of flat metal bent into proper shape, each beater being supported by the wire yoke 21. This yoke is substantially U-shaped, and an important feature of my invention consists in securely holding the yoke attached to the handle. To this end the inner face of each leg of the shank 12, below the bearing 14, is provided with intersecting slots 22 and 23, extending vertically and horizontally respectively, and near its upper end each of the longitudinal strands of the yoke 21 is provided with a cross pin 24, the strand resting in the slot 22 and the cross pin in the slot 23. In this manner the yoke and the beaters supported thereby are firmly retained in the handle when the members A and B thereof are secured in superimposed relation.

Carried in the bearings 14 is a bushing 25 in which is rotatably supported the crank handle 26 on the shaft of which is secured the disk 27 having the oppositely arranged gear rings 28 thereon. This constitutes the driving gear. The driving gear is mounted in the space between the legs of the shanks 12 and is held against lateral movement or wabbling in such space by the friction block 29.

For the purpose of imparting rotary movement to the beater members 20, each thereof carries at its top a pinion 30 in mesh with one of the gear rings 28, and to prevent the gears 28 and 30 from working out of mesh I provide the periphery of the disk 27 with a band 31 which acts as a guard or support for the pinions 30 on their under faces thereby preventing said pinions from moving lengthwise out of mesh with the gear rings 28. It will be noted that the band 31 is slightly wider than the combined width of the disk 27 and gear rings 28 so as to extend under the pinions 30.

The device as above described is assembled as follows:—The handle members A and B being separated, the crank handle 26, carrying the driving gear, is placed in position in the half-bearings 14 in one handle member. Thereafter the yoke 21, carrying the beaters 20, is positioned so that the upper ends of its strands lie in the slots 22 and the cross pins 24 lie in the slots 23, with the pinions 30 in mesh with the gear rings 28 above the band 31. Thereupon the members A and B are secured together by the claws 16 entering the slots 17 and the rivets 18 passing into the holes 19, and when the ends of the rivets are upset the entire device is complete and forms a firmly united entity.

As is well known, the device is operated by resting the lower end of the yoke 21 in the receptacle containing the substance, to be beaten, and rotating the handle 32 whereby the gear rings 28 will turn, causing rotation of the pinions 30 and of the beaters 20. The ratio between gears 28 and pinions 30 is such that the latter will turn at a much greater speed than the former.

I claim:—

1. In an egg beater, the combination of a handle comprising like members each having a bifurcated shank the lower face of each branch of the shank of one member having a slot therein, an angular lug projecting from each branch of the shank of the other member, said lugs being adapted to enter said slots, a main gear wheel supported in the space between the bifurcated shanks of the handle, beaters depending from said handle, pinions carried by said beaters and meshing with said gear wheel, and means for rotating the main gear wheel to impart rotary motion to the beaters.

2. In an egg beater, the combination of a handle having a bifurcated shank, a main gear wheel rotatably supported between the branches of said bifurcated shank, said gear wheel comprising a disk having a gear ring on each lateral face immediately adjacent the periphery of said disk, beaters depending from said handle, pinions carried by said beaters and meshing with said gear rings, and a guard band about the periphery of said disk, said guard band being of sufficient width to project beyond the periphery of the disk and below the under faces of said pinions to retain said pinions and gear rings in mesh.

In testimony whereof I have affixed my signature in presence of two witnesses.

LOUIS ULLMAN.

Witnesses:
CLARICE FRANCK,
PAULA WEBBER.